United States Patent [19]
Proshan

[11] Patent Number: 5,458,094
[45] Date of Patent: Oct. 17, 1995

[54] SEPARABLE GARMENT FOR GREY-HOUND

[76] Inventor: Mary-Elizabeth Proshan, 301 N. Harrison St., Princeton, N.J. 08540

[21] Appl. No.: 151,810

[22] Filed: Nov. 15, 1993

[51] Int. Cl.$^6$ ................................................ A01K 27/00
[52] U.S. Cl. ........................................ 119/850; 2/1; 2/69
[58] Field of Search ................................ 119/712, 725, 119/728, 850, 856, 857; 2/69, 1, 243.1; 602/119

[56] References Cited

U.S. PATENT DOCUMENTS

| | | | |
|---|---|---|---|
| 1,595,834 | 8/1926 | Griffiths | 119/850 |
| 2,103,109 | 12/1937 | De Mar | 119/850 |
| 2,222,705 | 11/1940 | Conlon | 119/850 |
| 3,742,679 | 7/1973 | Jordan | 119/850 |
| 4,266,299 | 5/1981 | Beal | 2/913 |
| 4,355,600 | 10/1982 | Zielinski | 119/850 |
| 4,489,676 | 12/1984 | Colquist | 602/119 |

FOREIGN PATENT DOCUMENTS 2192529  1/1988  United Kingdom ................ 2/69

Primary Examiner—C. D. Crowder
Assistant Examiner—Gloria Hale

[57] ABSTRACT

An outer flexible garment is adapted to be easily and quickly fitted onto or removed from a grey-hound. The garment employs first and second garment members adapted to be detachably connected to each other when fitted together around a grey-hound and when so fitted engaging and being wrapped around a lower portion of its neck, its front quarters, and the remaining portions of its entire body other than the tail and rear legs. The first and second members are mirror images of each other.

4 Claims, 2 Drawing Sheets

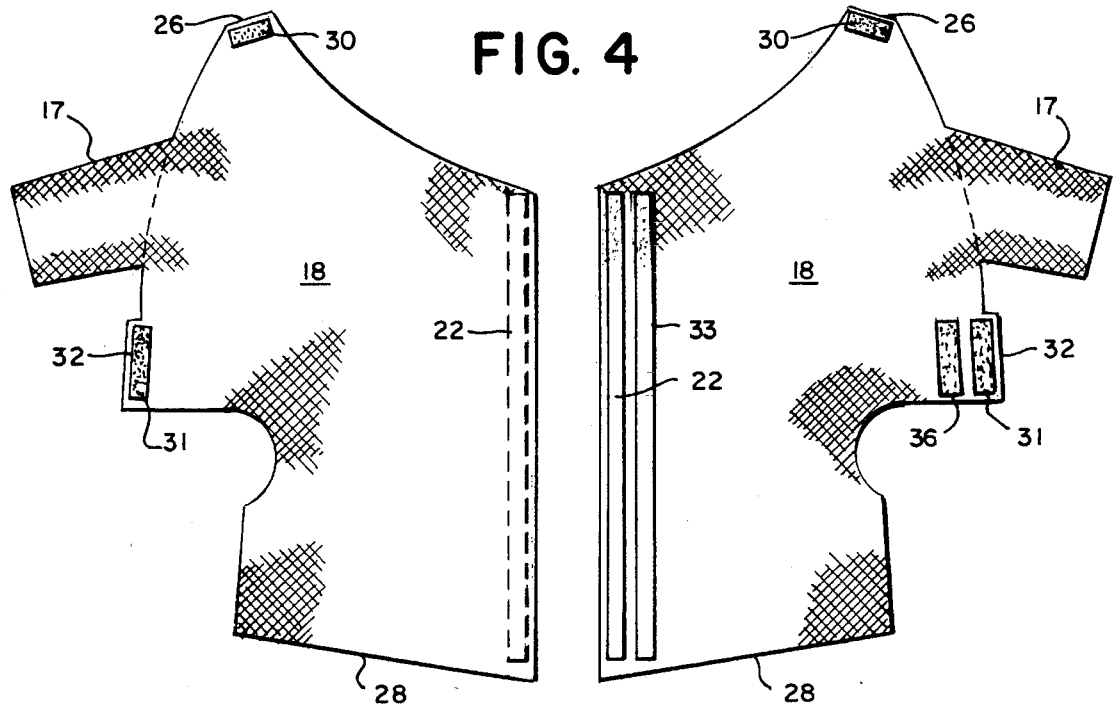
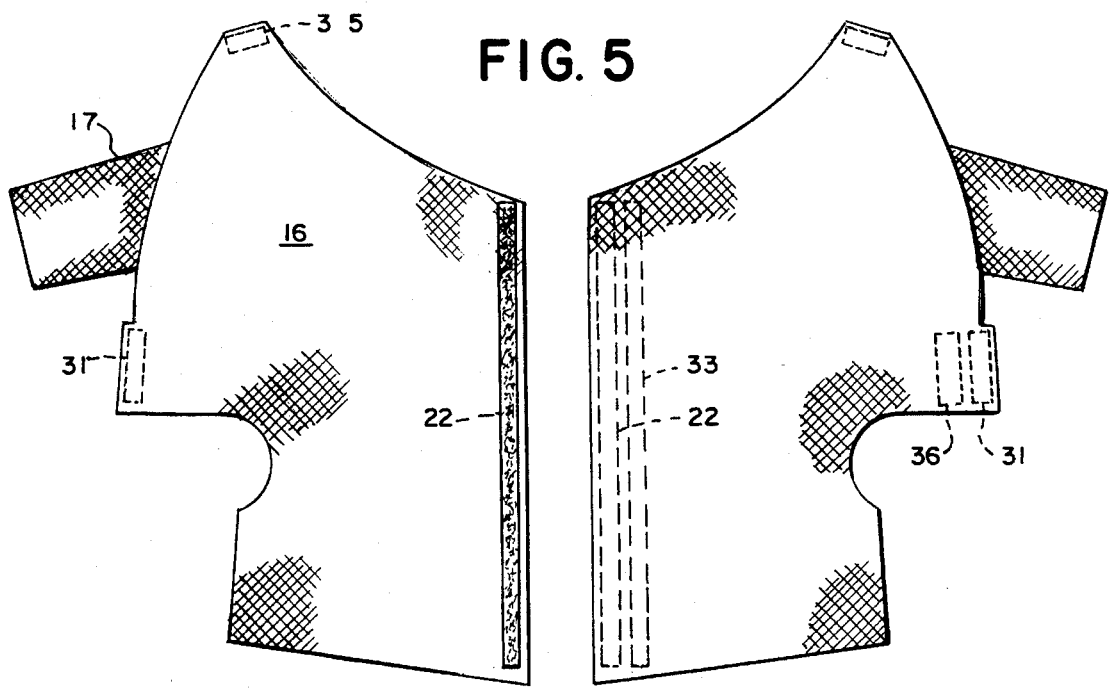

SEPARABLE GARMENT FOR GREY-HOUND

BACKGROUND OF THE INVENTION

Grey-hounds, particularly grey-hounds used in racing, can run at very high speeds for short periods. However, because grey-hounds are exhausted upon completing a race, they are apt to become chilled and ill unless they are immediately covered by a protective garment to keep them warm. The same condition applies prior to being a race since the grey-hound must be allowed to defecate and urinate and is walked or allowed to run briefly for this purpose.

While known garments are available for such use, such garments are one piece garments and are relatively difficult to use. In the first place, once such garments are fitted on grey-hounds, they cannot be removed quickly. Hence prior to a race, such garments must be removed in time to enable a grey-hound to race without carrying the garment, because the contraint and weight of the garment will reduce the racing speed. In addition, an appreciable time is required to fit the garment in place around a grey-hound imediately after completing a race, and during this time the grey-hound can become chilled.

SUMMARY OF THE INVENTION

Accordingly, it is an object of the invention to provide a new and improved garment which can be fitted onto or removed from a grey-hound so quickly and so easily that the grey-hound will not become chilled or ill prior to beginning a race or after completing a race.

Another object is to provide a new and improved garment of the character indicated which utilizes two mating members.

These and other objects of the invention will either be explained or will become apparent hereinafter.

In accordance with the principles of this invention, a flexible outer flexible garment is adapted to be easily and quickly fitted onto or removed from a grey-hound.

The grey-hound is a slender dog with a narrow head. It has a relatively long body extending between and connected to two front quarters and two hind quarters. Each quarter includes a corresponding one of the four legs. The greyhound has a relatively long neck connecting tile head to the front quarters and has a tail connected to the hind quarters.

The garment employs first and second garment members adapted to be detachably connected to each other when fitted together around a grey-hound and when so fitted engaging and being wrapped around a lower portion of the neck, the front quarters, and the remaining portions of the entire body other than the tail and rear legs, the first and second members being mirror images of each other.

These first and second members can be quickly and easily fitted around opposite sides of the grey-hound and then detachably engaged or can be quickly and easily disengaged and removed when desired.

Enhanced protection can be obtained by providing each member with an integral attachment which extends downwardly to receive and engage an upper portion of the corresponding front leg.

BRIEF DESCRIPTION OF THE DRAWINGS

FIG. 4 is a plan view of the inner surfaces of both members.

FIG. 5 is a plan view of tile outer surfaces of both members.

DETAILED DESCRIPTION OF PREFERRED EMBODIMENTS

Figure 1:
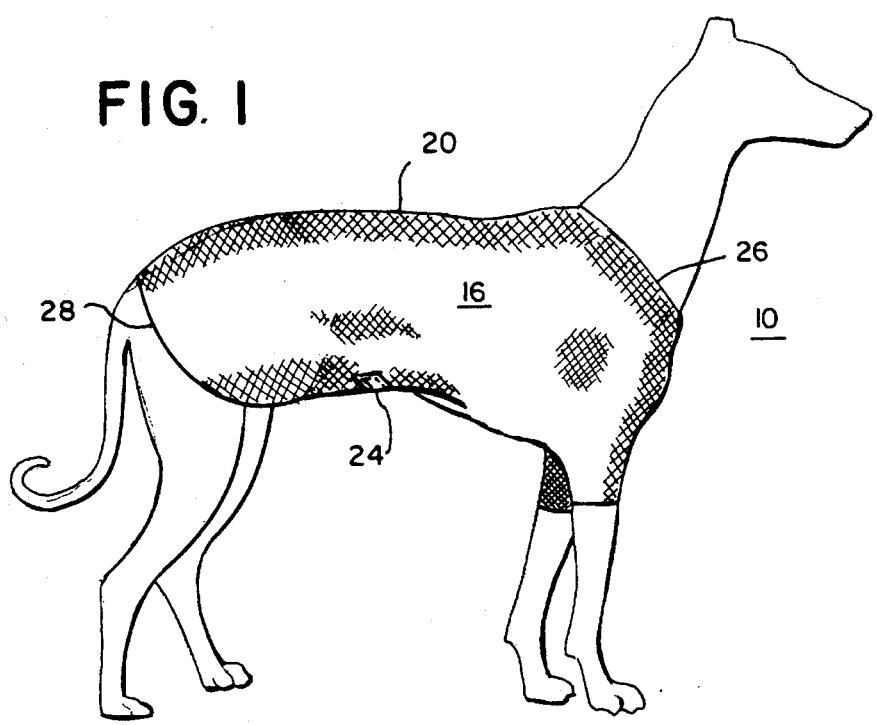
FIG. 1 is a side perspective view of a grey-hound filled with a garment in accordance with the invention.

Referring now to FIGS. 1–5, a typical grey-hound identified generally at 10 is a slender dog with a narrow head, a relatively long body extending between and connected to two front quarters, and two hind quarters. Each quarter includes a corresponding one of the four legs. The greyhound has a relatively long neck connecting the head to the front quarters and has a tail connected to the hind quarters.

First and second garment members 12 and 14 are adapted to be detachably connected to each other when fitted together around a grey-hound and when so fitted engage and are wrapped around a lower portion of the neck, the front quarters, and the remaining portions of the entire body other than the tall and rear legs. Member 12 is adapted to cover the left side of the grey-hound while member 14 is adapted to cover the right side of the grey-hound. Members 12 and 14 are mirror images of each other. These members are formed from any one of different flexible outer garments known to the art.

Each member can be provided with an integral attachment 17 which extends downwardly to receive and engage an upper portion of the corresponding front leg. Each attachment can completely surround the upper portion of the corresponding front leg. Each attachment when engaging the corresponding front leg, as shown, defines a hollow cylinder open at both ends.

Each member has an outer surface 16, an inner surface 18 and an upper horizontal edge 20. One member is provided with at least one elongated first strip 22 on the inner surface disposed adjacent the corresponding upper edge and parallel thereto. The other member is provided with a first strip on the outer surface disposed adjacent the corresponding upper edge and parallel thereto. The first strips being adapted for detachable mating engagement.

These and all other strips disclosed herein are of VELCRO employing hooks or loops, so that one strip has hooks and the mating strip has loops.

Each member has a suitably contoured lower edge 24 with lower front end and rear end portions 26 and 28. One member is provided with at least one second strip 30 on the inner surface of the front end portion 26 which extends almost at right angles to the corresponding first strips. The other member is provided with a second strip on the outer surface of the front end portion 26 which extends almost at right angles to the corresponding first strips. The second strips are adapted for detachable engagement.

The lower edge 24 of each member has a central portion 32 intermediate the front and rear end portions which is essentially parallel to the corresponding upper edge of said each member, the inner surface of one central portion being provided with at least one third strip 31 essentially parallel to the first strips and the outer surface of the other central portion being provided with at least one third strip 31 essentially parallel to the first strips. The third strips being adapted for detachable mating engagement.

In the garment as thus far described, the members will fit a greyhound of given size but are not adapted to fit greyhounds of different sizes. However, when either one of the members is provided with a second first strip 33 parallel to the other first strips whereby the members when fitted together on a grey-hound can be adjusted to fit grey-hounds of different sizes by selecting either one of the first and second first strips of the said one member to engage the first strip on the other member. Similarly, either one of the members is provided with a second third strip 35 parallel to the other third strips whereby the members when fitted together on a grey-hound can be adjusted to fit grey-hounds of different dimensions by selecting either one of the first and second third strips of the said one member to engage the third strip on the other member.

Figure 2:
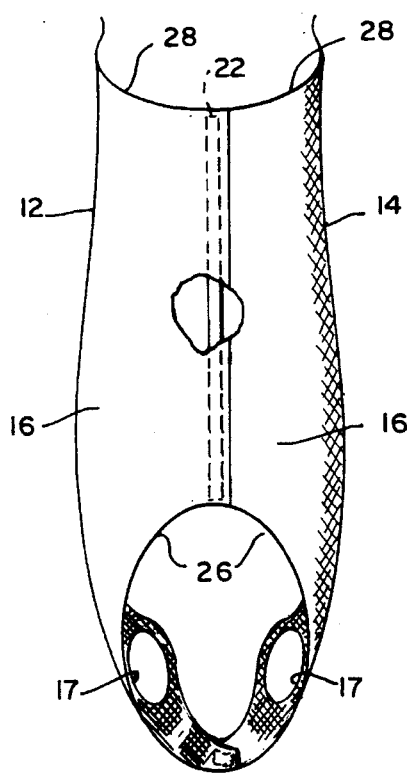
FIG. 2 is a top perspective view of the garment of FIG. 1 showing two connected members wherein for purposes of clarity the grey-hound is not shown.
Figure 3:
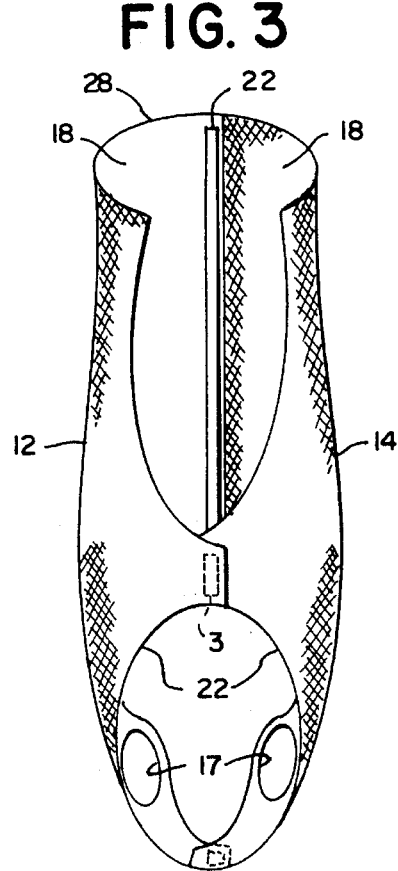
FIG. 3 is a bottom perspective view of interconnected members shown in FIG. 2.

For ease of explanation, the additional strips 22 and 35 are not shown in FIGS. 2 and 3, but are shown only in FIGS. 4 and 5.

While the invention has been described with particular reference to the drawings, the protection solicited is to be limited only by the terms of the claims which follow.

What is claimed is:

1. An outer flexible garment adapted to be easily and quickly fitted onto or removed from a greyhound, said greyhound being a slender dog with a narrow head, a relatively long body extending between and connected to its front quarters and its hind quarters, each quarter including a corresponding one of the four legs, a relatively long neck connecting the head to the front quarters and a tail connected to the hind quarters, said garment comprising:

first and second completely separate garment members adapted to be detachably connected to each other when fitted together around a greyhound and when so fitted engaging and being wrapped around a lower portion of the neck, the front quarters, and the remaining portions of the entire body other than the tail and rear legs, the first and second members being mirror images of each other;

each member having an integral attachment which extends downwardly to receive and engage an upper portion of the corresponding front leg, each attachment completely surrounding the upper portion of the corresponding front leg, each attachment when engaging the corresponding front leg defining a hollow cylinder open at both ends;

each member having an outer surface, an inner surface and an upper horizontal edge;

the first member being provided with at least one elongated first strip on the inner surface disposed adjacent the corresponding upper edge and parallel thereto;

the second member being provided with at least one elongated first strip on the outer surface disposed adjacent the corresponding upper edge and parallel thereto; the first strips of the first and second members adapted for detachable mating engagement;

each member having a lower edge contoured for mating engagement with the other member and with said body with the lower front and rear portions;

the first member being provided with at least one second strip on the inner surface of the front end portion which extends almost at right angles to the corresponding first strips;

the second member being provided with at least one second strip on the outer surface of the front end portion which extends almost at right angles to the corresponding first strips; the second strips of the first and second members being adapted for detachable mating engagement.

2. The garment of claim 1 wherein the lower edge of each member has a central portion intermediate the front rear end portions which is essentially parallel to the corresponding upper edge of said each member, the inner surface of the central portion of the first member being provided with at least one third strip essentially parallel to the first strip; the outer surface of the central portion of the second member being provided with at least one third strip essentially parallel to the first strip and the third strips being adapted for detachable mating engagement.

3. The garment of claim 2 wherein either one of the members is provided with a second first strip parallel and adjacent to the other first strips whereby the members when fitted together on a greyhound can be adjusted to fit greyhounds of different sizes by selecting either one of the first and second first strips of the said one member to engage the first strip on the other member.

4. The garment of claim 3 wherein either one of the members is provided with a second third strip parallel and adjacent to the other third strips whereby the members when fitted together on a greyhound can be adjusted to fit greyhounds of different sizes by selecting either one of the first and second third strips of the said one member to engage the third strip on the other member.

* * * * *